(12) United States Patent
Pajk

(10) Patent No.: US 6,913,015 B2
(45) Date of Patent: Jul. 5, 2005

(54) MODULAR SYSTEM FOR UTILIZATION OF SOLAR ENERGY FOR HEATING OF SANITARY WATER

(76) Inventor: Aljosa Pajk, Jeranova 12, Ljubljana (SI), 1000

( * ) Notice: Subject to any disclaimer, the term of this patent is extended or adjusted under 35 U.S.C. 154(b) by 0 days.

(21) Appl. No.: 10/477,437

(22) PCT Filed: May 8, 2001

(86) PCT No.: PCT/SI01/00013

§ 371 (c)(1),
(2), (4) Date: Nov. 7, 2003

(87) PCT Pub. No.: WO02/090839

PCT Pub. Date: Nov. 14, 2002

(65) Prior Publication Data

US 2004/0134483 A1 Jul. 15, 2004

(51) Int. Cl.[7] .................................. F04D 13/08
(52) U.S. Cl. ..................... 126/622; 126/664; 126/673; 126/710; 126/906
(58) Field of Search ................... 126/622, 663, 126/664, 672, 673, 710, 906

(56) References Cited

U.S. PATENT DOCUMENTS 4,210,122 A * 7/1980 Artweger .................. 126/622
4,359,043 A * 11/1982 Dominique et al. ........ 126/622

* cited by examiner

Primary Examiner—Jiping Lu
(74) Attorney, Agent, or Firm—King & Jovanovic, PLC

(57) ABSTRACT

The subject of the invention is modular system for utilization of solar energy for heating of sanitary water, which is composed from individual modules, each of which comprises a prefabricated, upper-outflow transparent (diaphanous), translucent or non-transparent element (1), one or several intermediate transparent (diaphanous), translucent or non-transparent element(s) (2), and a lower-inflow transparent (diaphanous), translucent or non-transparent element (3). Their mutual connection by means of junctions (4a, 4b) enables flow of nontransparent media from one element to the other while absorbing solar energy. Several modules can be mutually and in parallel connected to the modular system replacing the existing roofing tiles. The choice of an appropriate color for the nontransparent media makes the system compatible and consistent with the look of surrounding existing roof tiles.

Figure 1:
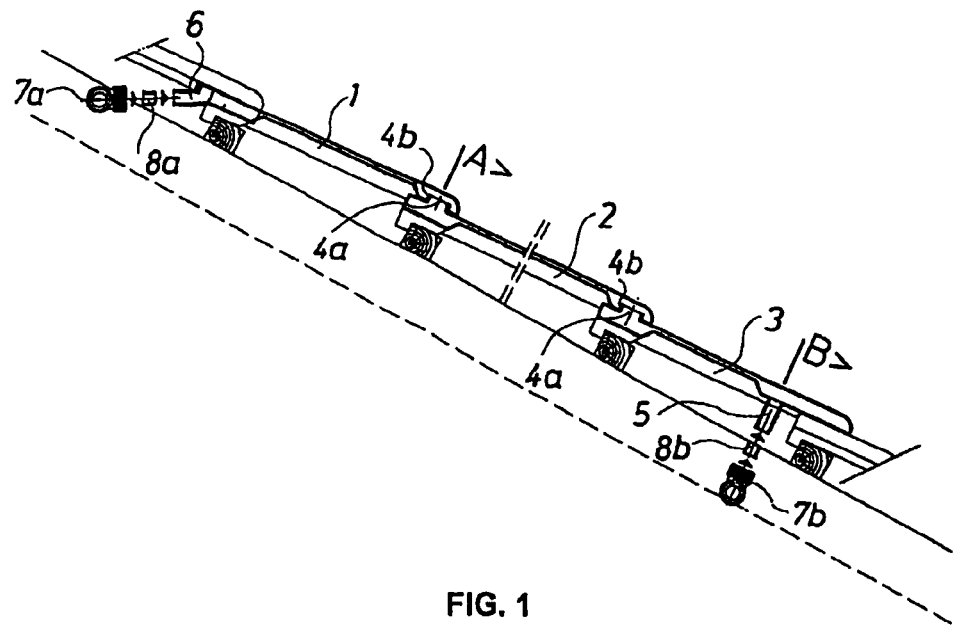

2 Claims, 3 Drawing Sheets view A view B

MODULAR SYSTEM FOR UTILIZATION OF SOLAR ENERGY FOR HEATING OF SANITARY WATER

The subject of the invention is modular system for utilization of solar energy for heating of fluids, gasses and solids, particularly for heating of sanitary water, heating of pool water, spatial heating in combination with floor heating, heating of air and other forms of heating with usage of solar energy. The relevant modular system is composed of prefabricated modules of transparent (diaphanous), translucent or non-transparent elements inside of which is an empty space for flow of nontransparent media. The invention is classified into F 24J 02/04 and E 04D 13/18 of international patent classification.

Technical problem, which this invention successfully solves, is a construction and implementation of such system for utilization of solar energy, which is simple for installation and maintenance and size of which can be easily adapted as regards available roofing area and the size of required heating area.

Imposed technical problem is solved with the construction and implementation of proposed modular system for utilization of solar energy for heating of sanitary water, which enables simple installation of mutually connected individual modules composed of the transparent (diaphanous), translucent or non-transparent elements containing an empty space for allowing the flow of the non-transparent media. The modules are to be used as exchange for existing roofing cover in case of existing building or, in case of newly constructed building, simple supplement to remaining roofing cover.

Known solutions of modular system for utilization of solar energy, as described in the patent documents, e.g. in. U.S. Pat. Nos. 4,296,740, 5,960,790 or WO 99/63280 assumes implementation of prefabricated panels, which are assembled in a system and placed on roof constructions. Major disadvantage of these solutions is particularly in incapability of adjustment of such systems as regards simple enlargement and up-grading of once already installed system. Besides these, the construction implementations of mentioned solutions require numerous additional solutions for reliable sealing of entire system on the roofing of a building and mutual sealing among panels.

Solutions exist, which presume implementation of entire roof construction in seance of storage tank of solar energy for heating of sanitary water. One of such solutions is described in the patent document WO 99/54670. Such solution is not universally applicable, because it conditions certain visual look of the roofing, that can not be included into each environment, while at the same time the servicing in case of potential damaging of such construction is questionable.

The system for solar heating can be made also from individual solar panels of different shapes and of different mutual connections among the panels, in case of which the panels are installed on the roofing over special supportive (bearing) construction(s), so that the panels are placed over tiles or are exchanging the tiles. In patent documents there are numerous different versions of such panel design, ranging from flat shaped to panels in shape of tiles, mutually connected into the system.

The subject of the invention is modular system for utilization of solar energy for heating of sanitary water, which is composed from individual modules. Each module is composed of prefabricated and mutually connected transparent (diaphanous), translucent or non-transparent elements: the upper-outflow, the intermediate and the lower-inflow transparent element. Mutual connection of stated elements composes one module of the system. Several modules can be in parallel connected to assemble the system and to simply replace existing tiles. Through the transparent (diaphanous) or translucent elements of module flows non-transparent media made, where with selection of color of the non-transparent media appropriate visual look of the module is created to adjust the color of the module to the color of the reminder roof cover. Transparent (diaphanous) or translucent element in combination with nontransparent media creates greenhouse effect.

Figure 2:
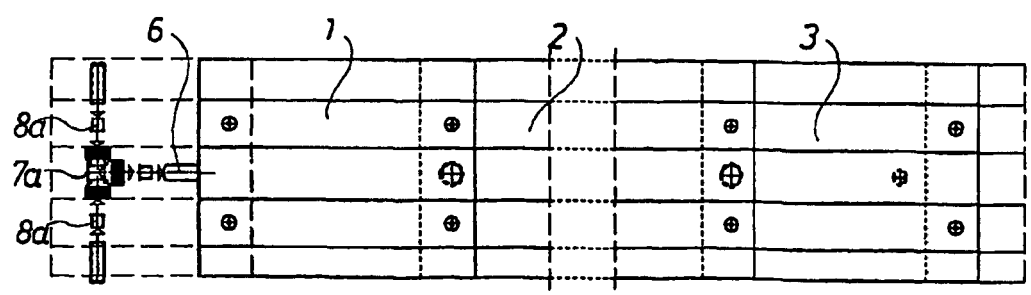
Figure 3:
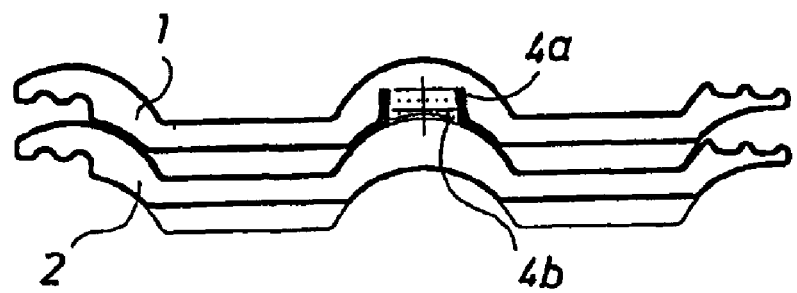
Figure 4:
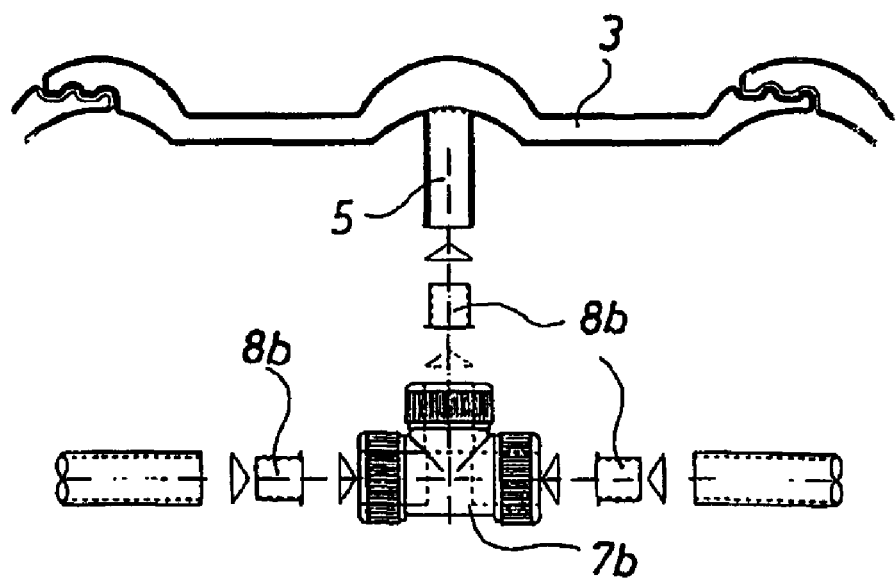
Figure 5:
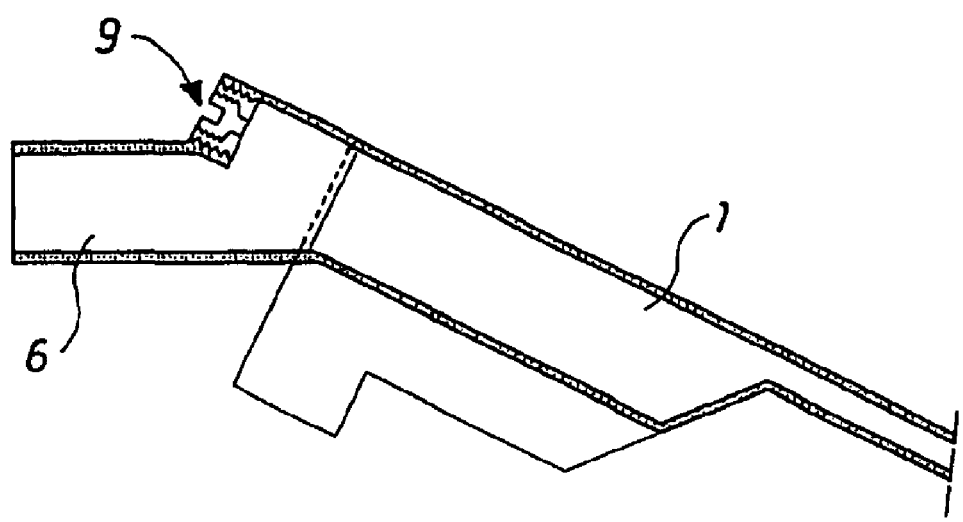

The invention will be described in detail on basis of the execution example and by illustrations, where the figures show:

FIG. 1 the module of the system for utilization of solar energy for heating of sanitary water as being placed in roofing, according to the invention (side view and partial section), FIG. 2 the module of the system for utilization of solar energy for heating of sanitary water, according to the invention, with illustration of possibility of module extension (top view), FIG. 3 cross-section view (A) of the module of the system for utilization of solar energy for heating of sanitary water, according to the invention, FIG. 4 cross-section view (B) of the module of the system for utilization of solar energy for heating of sanitary water, according to the invention, FIG. 5 cross-section view of detail of the upper-outflow transparent element of the module of the system for utilization of solar energy for heating of sanitary water with placement and design of air exhaust valve, according to the invention.

The module for utilization of solar energy for heating of sanitary water, presented in FIG. 1 as being placed in roofing, is composed of upper-outflow transparent (diaphanous), translucent or non-transparent element (1), the (one or several) intermediate transparent (diaphanous), translucent or non-transparent element(s) (2), and the lower-inflow transparent (diaphanous), translucent or non-transparent element (3). All three transparent (diaphanous), translucent or non-transparent elements (1, 2, and 3) of individual module are adapted to different designs of roofing tiles. On figures presented examples of transparent (diaphanous), translucent or non-transparent elements (1, 2 and 3) are adapted to the design of a classic concrete-made roofing tile. All three transparent (diaphanous), translucent or non-transparent elements (1, 2 and 3) have an inside empty space, which can represents partial or entire volume of the individual transparent (diaphanous), translucent or non-transparent element (1, 2 or 3) and can be filled with the nontransparent media, which enables transformation and transfer of the heat. Color of the nontransparent media is any color whatever, by selection of which the color of media in transparent (diaphanous) or translucent elements (1, 2 or 3) can be combined with the look of entire roofing.

In frame of the system, according to the invention, the upper-outflow transparent (diaphanous), translucent or non-transparent element (1), (one or several) intermediate transparent (diaphanous), translucent or non-transparent element(s) (2), and lower-inflow transparent (diaphanous), translucent or non-transparent element (3) of individual module are mutually connected with assistance of adequately shaped junctions (4a, 4b). The module is over the outflow outlet (6) of the upper-outflow transparent (diaphanous), translucent or non-transparent element (1), the reinforcement insert (8a) and the connection fitting element (7a) on one side as well as over the inflow inlet (5) of the lower-inflow transparent (diaphanous), translucent or non-transparent element (3), the reinforcement insert (8b) and the connection fitting element (7b) on the other side connected with outlet or inlet pipe, respectively. In such way, optional number of individual modules can be attached to both, the outlet and inlet pipes.

In the upper-outflow transparent (diaphanous), translucent or non-transparent element (1) of individual module, above the outflow outlet (6) the air exhaust (9) valve is designed.

By positioning the individual modules in the system, according to the invention, as presented in FIG. 1, and connecting the system to inflow of the cold nontransparent media over the inflow inlet (5) and by flow of the heated nontransparent media trough the outflow outlet (6), the air exhaust valve (9) can be used to exhaust each individual module and, thereby, prevent creation of air-pockets, which hampers media flow and reduces efficiency of the system.

To obtain efficient utilization of solar energy and regarding available roofing area several individual modules can be mutually and in parallel connected in the system, where each module is composed of elements as stated previously. The length of the module can be adjusted as regards the number of the intermediate transparent (diaphanous), translucent or non-transparent elements (2).

Due to the described design of individual transparent element and described structure and functionality of individual module, each module represents functionally closed entity, which can be exhaust individually and in case of servicing disconnected from the system.

What is claimed is:

1. Modular system for utilization of solar energy for heating of fluids, gasses and solids with usage of solar energy characterized by, being composed of individual modules, which are composed of prefabricated and with assistance of connection junctions (4a, 4b) mutually connected transparent (diaphanous), translucent or non-transparent elements (1, 2, and 3), through which flows the nontransparent media, the individual module is composed of the upper-outflow transparent (diaphanous), translucent or non-transparent element (1), the (one or several) intermediate transparent (diaphanous), translucent or non-transparent element(s) (2), and the lower-inflow transparent (diaphanous), translucent or non-transparent element (3), where several modules are possible to be mutually and in parallel connected into the modular system, that individual module is over the outflow outlet (6) of the upper-outflow transparent (diaphanous), translucent or non-transparent element (1), the reinforcement insert (8a) and the connection fitting element (7a) on one side as well as over the inflow inlet (5) of the lower-inflow transparent (diaphanous), translucent or non-transparent element (3), the reinforcement insert (8b) and the connection fitting element (7b) on the other side connected between outlet or inlet pipe, respectively, containing heating nontransparent media, and that on the upper-outflow transparent (diaphanous), translucent or non-transparent element (1) the air exhaust valve (9) is designed proximate to and above the outflow outlet (6), the air exhaust valve (9) providing fluid communication with the ambient conditions, so as to foster the egress of air, while containing fluid therewithin, to, in turn, enhance fluid flow through the individual model.

2. Modular system for utilization of solar energy for heating of sanitary water, according to claim 1, characterized by, that the upper-outflow transparent (diaphanous), translucent or non-transparent element (1) the intermediate transparent (diaphanous), translucent or non-transparent element (2), and the lower-inflow transparent (diaphanous), translucent or non-transparent element (3) are adapted to different designs of roofing tiles.

* * * * *